April 22, 1969 J. R. FILSON 3,439,859
BRAZING SLUG
Filed July 27, 1967 Sheet 2 of 2
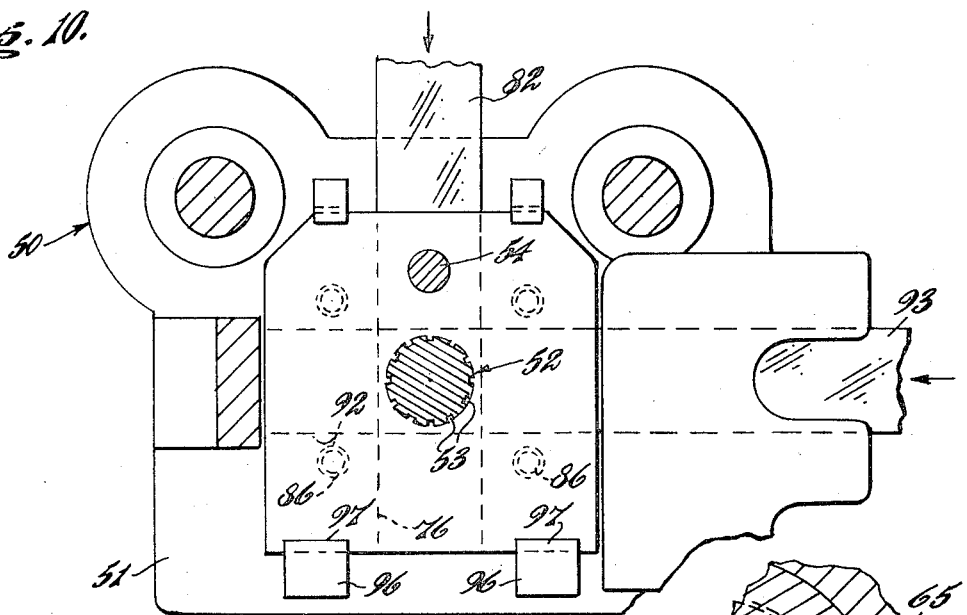
Fig. 10.
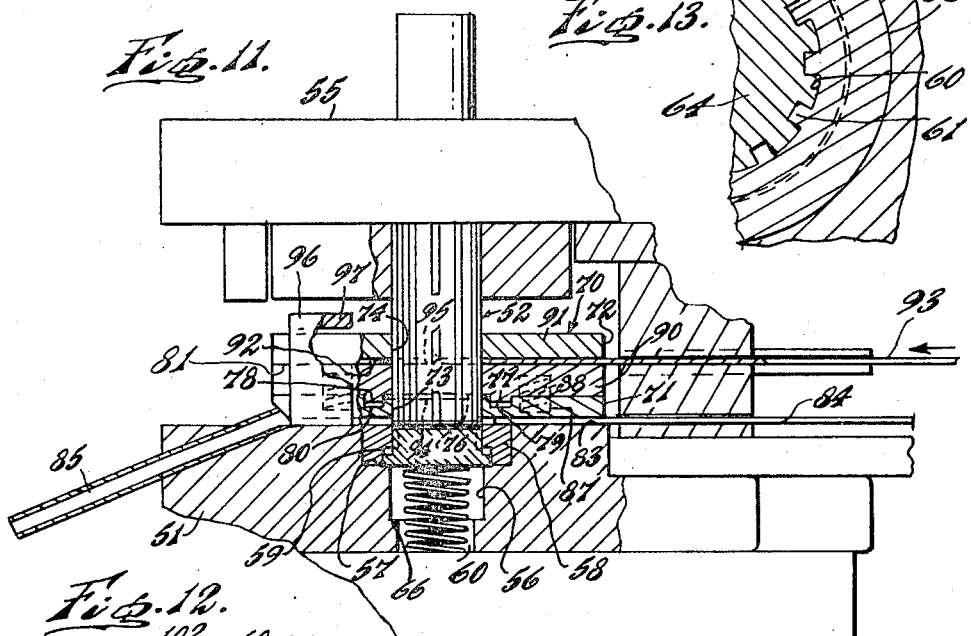
Fig. 11.
Fig. 13.
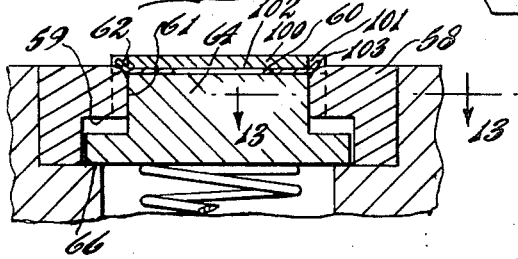
Fig. 12.
INVENTOR.
John Richard Filson
BY Robert K. Youtie
ATTORNEY

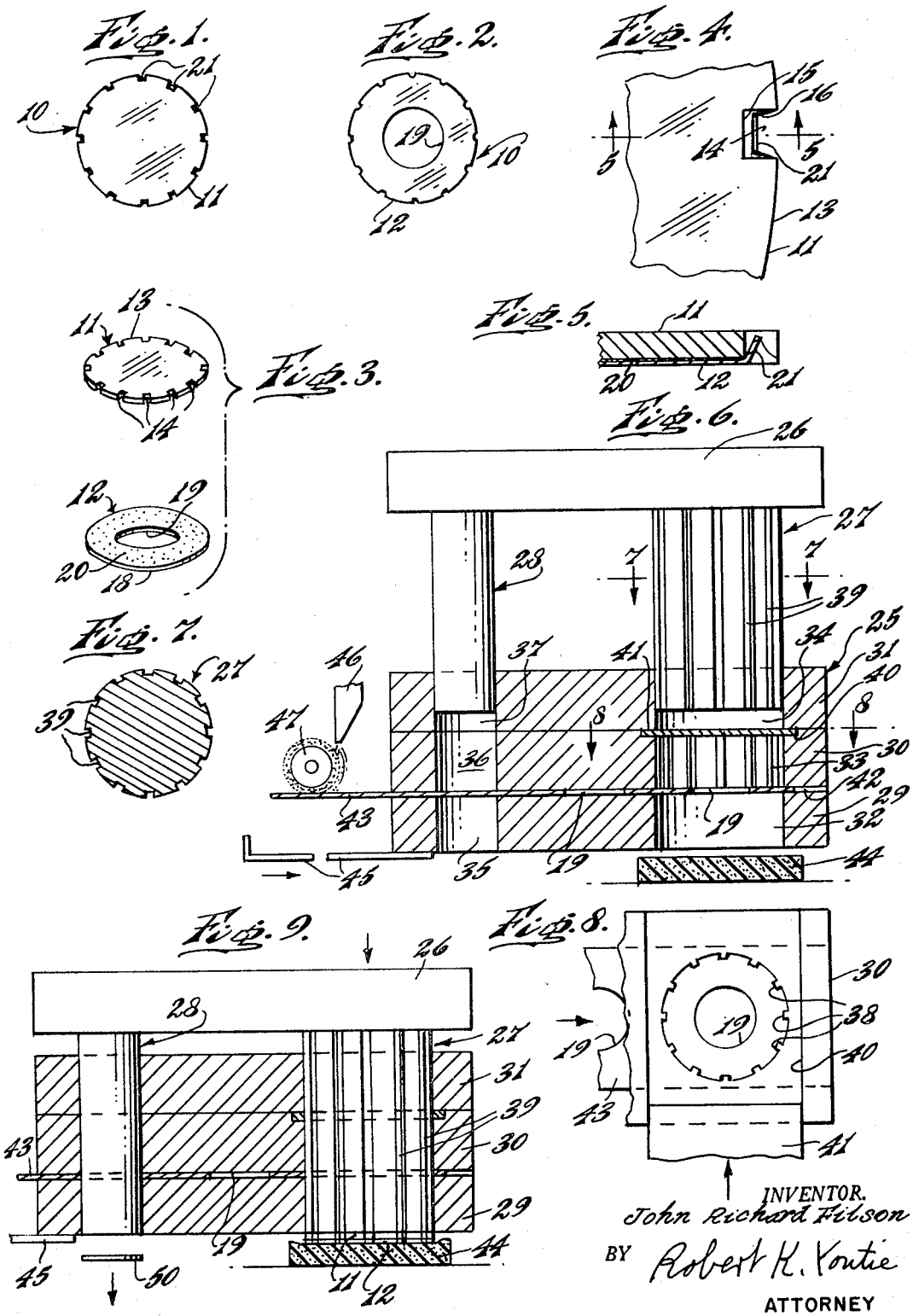

United States Patent Office 3,439,859
Patented Apr. 22, 1969

3,439,859
BRAZING SLUG
John Richard Filson, Medford, N.J., assignor to Matsushita Electric Industrial Co., Ltd., Osaka, Japan, a corporation of Japan
Filed July 27, 1967, Ser. No. 656,373
Int. Cl. B23k 35/14
U.S. Cl. 228—56     4 Claims

ABSTRACT OF THE DISCLOSURE

This invention is concerned essentially with a unique slug including a plate and brazing sheet in interfitting relation therewith, and relates to the manufacture of such a slug by a single punching operation utilizing an improved apparatus.

Background of the invention

While the brazing slug has been primarily developed and employed for use in reinforcing ammunition shells, and like articles, as by brazing to critical locations, it is capable of many varied applications all of which are intended to be comprehended herein.

The reinforcement of shells, and the like, as by the brazing thereto of a reinforcement plate, has heretofore involved considerable time, effort and expense, as in formation of the reinforcement plate, and in the brazing procedure involving the use of brazing material and flux.

Summary

Accordingly, it is an important object of the present invention to provide a unique brazing slug, and method and apparatus for manufacturing the same, wherein a reinforcing plate is incorporated with a brazing material, and wherein flux may also be incorporated with the slug, permitting of extremely quick and easy application of the reinforcing slug to a shell, or the like.

Further, the instant invention contemplates the provision of a reinforcing or brazing slug, and method of manufacture and apparatus therefor, which is readily adaptable for securement to shells, and the like, by completely automatic equipment, including automatic feeding and brazing apparatus.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the construction hereinafter described, and of which the scope will be indicated by the appended claims.

Brief description of the drawing

FIGURE 1 is a plan view showing a brazing slug constructed in accordance with the teachings of the present invention, illustrating the plate side thereof.

FIGURE 2 is a plan view showing the opposite side of the slug of FIGURE 1, illustrating the brazing sheet incorporated with the plate.

FIGURE 3 is an exploded, perspective view showing the plate and sheet of the slug of FIGURES 1 and 2.

FIGURE 4 is a partial plan view similar to FIGURE 1, greatly enlarged, and illustrating the connection between the plate and brazing sheet.

FIGURE 5 is a sectional view taken generally along the line 5—5 of FIGURE 4.

FIGURE 6 is an elevational view, partly in section, showing a punch press and illustrating an early state in the method of manufacture of the present invention.

FIGURE 7 is a sectional view taken generally along the line 7—7 of FIGURE 6.

FIGURE 8 is a sectional view taken generally along the line 8—8 of FIGURE 6.

FIGURE 9 is a sectional elevational view similar to FIGURE 6, but illustrating a later stage in the instant method.

FIGURE 10 is a horizontal sectional view illustrating an improved apparatus in accordance with the teachings of the present invention for manufacturing the instant laminated brazing slug.

FIGURE 11 is an elevational view, partly in section, showing the apparatus of FIGURE 10.

FIGURE 12 is a partial sectional elevational view similar to FIGURE 11, enlarged for clarity.

FIGURE 13 is a partial horizontal sectional view taken generally along the line 13—13 of FIGURE 12.

Referring now more particularly to the drawing, and specifically to FIGURES 1–5 thereof, the brazing slug of the present invention is there generally designated 10 in FIGURES 1 and 2, while the component parts of the slug are best seen in FIGURE 3 as including a plate 11 and a sheet 12 of brazing material.

The plate 11 may be of suitable configuration for the intended purpose, being illustrated as generally round or circular and having a peripheral edge 13 extending between and generally normal to opposite faces of the plate. Formed in the peripheral edge 13, say at a plurality of equally spaced intervals thereabout, are notches 14, each of which may be of generally rectangular configuration. That is, the notches 14 may each include three sides of a rectangle, the remaining side opening radially outwardly from the plate. The configuration of notches 14 is best seen in FIGURES 4 and 5, each notch including an inner edge 15, and a pair of side edges 16 extending from opposite ends of the inner edge 15 generally radially outward to and intersecting with the peripheral edge 13. The plate 11 may be of any suitable material for brazing, say steel, or other, as desired.

The brazing sheet 12 may be a relatively thin sheet of brazing material, say silver, and may have an outline configuration generally congruent to that of the plate 11, say being bounded by a generally circular peripheral edge 18, but the outline configuration of the brazing sheet 12 is unnotched. The central portion of the brazing sheet 12 may be removed, to conserve material, as by a central hole 19. Prior to assembly of the plate 11 and sheet 12, the latter may be substantially flat, as shown in FIGURE 3. Also, a flux material, as at 20 may be applied to one face of the brazing sheet 18, which flux material may advantageously possess certain adhesive qualities.

In the finished form, the slug 10 includes the brazing sheet 12 in facing, generally congruent relation with the plate 10, with the flux 20 sandwiched therebetween. Further, the peripheral edge portions 21 of the brazing sheet 12, each overlying a respective edge notch 14 of the plate 10, are deformed into the adjacent notch, as best seen in FIGURES 4 and 5. These deformed peripheral edge portions 21 of brazing sheet 12 engage in the notches 14 to effectively secure the brazing sheet to the relatively rigid plate 10. The interposed flux material 20 may aid in this securement.

It will now be appreciated that a large number of slugs 10 may be conveniently handled, say by conventional coin- or disc-feeding machines for application to shells to be reinforced, the brazing action merely requiring application of heat. The prior requirements for separately introducing the plate, brazing material and flux have been completely eliminated.

The method of manufacture of the brazing slug 10 is best seen in FIGURES 6–9. A die is generally designated 25, and suitably fixed in a punch press by conventional means. The punch press includes a reciprocable carrier 26 carrying a pair of punches 27 and 28 for reciprocation in the die 25.

More specifically, the die 25 may be fabricated in three parts, including a lower part 29, an intermediate part 30 superposed on the lower part, and an upper part 31 on the intermediate part 30. The die parts 29, 30 and 31 are formed with aligned thru holes 32, 33 and 34, combining to define a generally cylindrical cavity for receiving the punch 27. An additional plurality of aligned thru holes 35, 36 and 37 are formed in respective die parts 29, 30 and 31 defining a cavity for receiving the punch 28, and located in spaced relation with respect to the cavity 32, 34.

The lower and upper holes 32 and 34 of the lower and upper die parts 29 and 31 may be generally cylindrical, while the hole 33 of the intermediate die part is generally cylindrical, but formed with vertically extending ribs or lands 38 arranged around its interior, extending in substantial parallelism with each other. The punch 27 is generally cylindrical for sliding fit in holes 32 and 34, and is further formed on its cylindrical surface with a plurality of circumferentially arranged, generally parallel grooves or flutes 39 for respective reception of ribs 38.

A plate-feed slot 40 extends horizontally through the die 25, just below the upper-part hole 34, for passing plate material 41, in strip form, in the path of movement of the punch 27.

An additional feed slot 42 may be formed in the die 25, extending horizontally therethrough, between the lower and intermediate die parts 29 and 30. Further, the feed slot 42 extends transversely through both the cavity 32–34 and the cavity 35–37, for receiving a strip 43 of brazing material. Thus, as best seen in FIGURE 6, the strip of brazing material 33 passes first through the cavity 35–37, where it is formed with a small hole 19. The strip 43 then progresses, stepwise, to locate the hole 19 centrally in the cavity 32–34. In spaced relation above the strip 43 in the cavity 32–34 is the plate material 41.

Beneath the cavity 32–34 is located a bed 44 of suitably yieldable material, such as resiliently deformable rubber, or the like. The bed 44 may be spaced slightly below the underside of die 25, and an ejector 45 may be slidable between the die and bed, for a purpose appearing presently. As the strip 43 of brazing sheet is fed into the die 25, flux may be applied to its upper surface, as by a nozzle 46, and applying wheel 47, or other suitable flux-applying means. Thus, the upper side of the brazing-material strip 43 is provided with flux.

Upon the downstroke of punch 27, it will be appreciated that the punch moves against the upper surface of sheet 41, punching the latter to form the plate 11 having peripheral notches 14, as by interfitting of the die ribs 33 and punch grooves 39. The punch 27 continues its downward stroke moving the punched plate downward against the upper, flux-covered surface of sheet 43, and effects punching action thereof to form an annular plate 12. As the internal surface of die-part hole 32 is generally cylindrical, the peripheral configuration of sheet 12 is generally circular, edge portions thereof extending across the notches formed in the punched plate.

Upon continued downstroke of the punch 27, the punch bears against the upper surface of plate 11, which in turn bears against the flux-covered upper surface of brazing sheet 12, the underside thereof being pressed forcibly against the upper surface of resiliently deformable bed 44. This causes the portions 21 of brazing sheet 12 adjacent to the plate notches 14 to be deformed into the notches and assume the configuration illustrated in FIGURES 4 and 5.

Simultaneously, a hole 19 is punched in the brazing strip 43, waste falling from the die, as at 50 in FIGURE 9. Upon the upstroke of the carrier 26 and punches 27 and 28, the ejector 45 may shift laterally to displace the assembled slug 10 from beneath the die 25, preparatory to repetition of the above-described manufacturing method.

Referring now to the apparatus illustrated in FIGURES 10–13, a punch press is there generally designated 50, and may include a generally horizontal, upwardly facing bed 51. A generally vertically extending punch 52 is mounted for longitudinal or vertical reciprocation toward and away from the bed 51, and is of a cylindrical, externally fluted or longitudinally grooved configuration, say having grooves 53. An auxiliary punch is shown at 54 and may be generally cylindrical of smaller diameter than the punch 52, the punches 52 and 54 corresponding to the punches 27 and 28 of the previously described embodiment. The punches 52 and 54 are carried by a vertically reciprocable arm 55 for movement therewith toward and away from the bed 51.

Centrally of the bed 51, there is provided an upwardly opening hole 56 having formed therein an annular, upwardly facing shoulder 57. A retaining member or ring 58 is located in the hole 56, seated on the shoulder 57, and may have its upper surface substantially flush with the upper surface of the bed 51. Suitable means (not shown) may be employed for releasably securing the retainer 58 in position within the hole 56. The annular retainer 58 is undercut to define an internal, downwardly facing annular shoulder 59 facing toward and spaced over the upwardly facing shoulder 57. The central opening 60 of the annular retainer 58 may be generally cylindrical, and formed with a plurality of angularly spaced, internal projections or ribs 61 extending generally vertically from the downwardly facing shoulder 59 to the upper side of the retainer, and having their upper ends smoothly arcuate, as at 62.

Received within the central opening 60 of the retainer 58 is a disclike engaging member 64 having its periphery formed with a plurality of circumferentially spaced, generally vertically extending grooves 65 respectively receiving internal projections 61. A resilient member, such as a coil compression spring 66 may be interposed between the underside of engaging member 64 and the lower end of hole 56 to urge the engaging member resiliently upwardly. Extending about a lower region of the engaging member 64 may be an annular flange 66 movable with the engaging member downwardly into limiting engagement with the upwardly facing shoulder 57, and upwardly into limiting engagement with the downwardly facing shoulder 59.

Seated on the bed 51 is a punch-receiving die, generally designated 70. The die 70 may include a generally horizontally disposed lower part 71 directly on the bed 51, and a generally horizontally disposed upper part 72 superposed on the lower part. The lower part 71 may have a generally vertically extending, thru hole 73, and the upper part 72 may have a generally vertically extending thru hole 74 in alignment with the hole 73. Thus, the aligned holes 73 and 74 combine to open vertically through the die 70, downwardly to the bed 51, and upwardly for receiving the punch 52 upon vertical reciprocation of the latter. The undersurface 81 of the upper die part 72 is in facing engagement with the upper surface 75 of the lower die part 71. The undersurface 81 of the upper die part 72 is formed with a downwardly facing groove 76 extending entirely thereacross and having its opposite ends open. The downwardly facing groove 76 is bounded along its opposite sides with a pair of parallel depending ribs 77 and 78. The upper surface 75 of the lower part 71 is formed with complementary grooves 79 and 80, respectively receiving ribs 77 and 78. Thus, the adjacent, facing sides of ribs 77 and 78 define the side walls of groove 76; and further, the groove 76 combines with the adjacent nether portion of surface 75 to form a thru passageway extending transversely of and intersecting with the punch-receiving opening 73, 74. It will be appreciated, as from FIGURE 10, that the passageway 76 provides a guiding passage for the feeding therethrough of strip material 82, and that the passageway 76, as well as the strip 82 are of a lateral dimension greater than the diameter of hole 74.

Formed on the underside of lower die part 71 is a downwardly facing groove 83 extending across the lower end of hole 73, over retainer 58. The groove or passageway 83 slidably receives at one end an ejector 84, and has its other end in communication with a discharge chute 85.

Interposed between the lower die part 71 and upper die part 72 are a plurality of suitable resilient members, such as coil compression springs 86, each having its opposite ends received in respective facing recesses 87 and 88 formed in the facing die parts.

The upper die part 72 is advantageously of a sectional construction, including a lower section 90 superposed directly over the lower die part 71, and an upper section 91 superposed over the lower section 90. The underside of the upper section 91 may be formed with a downwardly facing groove 92 extending entirely across the upper section transversely of and intersecting with the thru hole 74, and of a lateral extent greater than the diameter of the hole, as best seen in FIGURE 10. The downwardly facing groove 92 serves as a passageway for the feeding of strip material 93 across the path of punch 52.

The hole 74 in the upper section 91 of upper die part 72 may be generally cylindrical, while the hole 74 in the lower section 90 of the upper part is provided with internal projections respectively conformably engageable in the grooves 53 of the punch 52. Thus, the intersection of the upper surface of lower section 90 with the hole 74 defines a cutting edge 95 having circumferentially spaced internal projections for cutting-edge notches, as in the previously described embodiment. Also, the intersection of the upper surface 75 of lower die part 71 with the hole 73 defines a cutting edge 94 which is generally circular or smooth.

Secured to the bed 51, at spaced locations about the die 70, are a plurality of holders 96, each having an upper end projection or lip 97 extending over the upper die section 91 and limiting upward movement thereof. That is, the force of springs 86 tends to separate the upper die part 72 from the lower die part 71, displacing the former upwardly against the flanges 97. This serves to open or expand the passageway 76 and facilitate feeding movement therethrough of the strip material 82.

Upon downward movement of punch 52, a piece of the material of strip 93 is punched therefrom by coaction between the punch 52 and cutting edge 95. The piece punched from strip 93 having edge notches corresponding to the internal projections in the hole 74 of lower section 90. This downward punch movement displaces the lower section 90 downward against the force of springs 86, to contract the passageway 76 and thereby clamp the strip material 82 in the passageway. Continued downward punch movement effects cutting of a piece from the strip material 82, by coaction with the relatively smooth cutting edge 94, so that the piece cut from the strip 82 is of generally circular or smooth-edged configuration, with smooth-edge portions thereof overlying or extending across the notched-edge portions of the piece cut from strip 93.

A notched piece 100 cut from the material 93 is shown in FIGURE 12, having edge notches 101. A relatively smooth edge piece 102 is shown in FIGURE 12, having been cut from the strip material 82 proximate to the bed 51, and having smooth-edge portions 103.

It will there be seen that the punch 52 has depressed the pieces 100 and 102 into facing engagement with each other and into resiliently depressing engagement with the disc member 64, to deflect the spring 66 and shift the engaging member downward. Simultaneously, the rounded upper end portions 62 of internal projections 61 have engaged in notches 101 of piece 100 to deform the relatively smooth or unnotched-edge portions 103 of piece 102 into the notches to effect a lamination between the pieces 100 and 102.

Upon upward retraction of the punch 52, the engaging member 64 elevates to locate the laminated pieces 100 and 102 in the passageway 83, whereupon the ejector 84 may slide through the passageway to discharge the laminated pieces through chute 85.

Of course, repeated feeding of the strips 82 and 93 may be automatically effected in timed relation with movement of punch 52; and, paste flux may be applied to one of the strips before lamination, as in the first-described embodiment.

From the foregoing, it is seen that the present invention provides a unique construction of brazing slug, as well as method and apparatus for manufacturing the same, all of which accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A brazing slug comprising a plate having edge notches, and a sheet of brazing material in facing relation with said plate and having portions overlying said notches, said overlying portions being deformed into said notches for securement of said sheet and plate.

2. A brazing slug according to claim 1, in combination with flux sandwiched between said sheet and plate.

3. A brazing slug according to claim 1, said notches being located on the periphery of said plate.

4. A brazing slug according to claim 3, said sheet being generally congruent to said plate and said deformed sheet portions being peripheral edge portions of said sheet.

References Cited

UNITED STATES PATENTS 3,221,970  12/1965  Lockshin _____ 228—56

RICHARD H. EANES, Jr., *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,439,859                                                           April 22, 1969

John Richard Filson

It is certified that error appears in the above identified patent and that said Letters Patent are hereby corrected as shown below:

In the heading to the printed specification, lines 3 to 5, "John Richard Filson, Medford, N. J., assignor to Malsushita Electric Industrial Co., Ltd., Osaka, Japan, a corporation of Japan" should read -- John Richard Filson, 95 N. Lakeside Dr., Medford, N. J. 08055 --.

Signed and sealed this 7th day of April 1970.

(SEAL)
Attest:

Edward M. Fletcher, Jr.                              WILLIAM E. SCHUYLER, JR.

Attesting Officer                                                       Commissioner of Patents